(12) United States Patent
Fiete et al.

(10) Patent No.: US 10,657,604 B2
(45) Date of Patent: May 19, 2020

(54) SYSTEMS, METHODS, AND PLATFORM FOR ESTIMATING RISK OF CATASTROPHIC EVENTS

(71) Applicant: Aon Global Operations Ltd. (Singapore Branch), Singapore (SG)

(72) Inventors: Stephen Fiete, Evanston, IL (US); Alok Bhattacharya, Chicago, IL (US)

(73) Assignee: Aon Global Operations Ltd. (Singapore Branch), Singapore (SG)

( * ) Notice: Subject to any disclaimer, the term of this patent is extended or adjusted under 35 U.S.C. 154(b) by 0 days.

(21) Appl. No.: 16/432,467

(22) Filed: Jun. 5, 2019

(65) Prior Publication Data

US 2019/0378216 A1 Dec. 12, 2019

Related U.S. Application Data

(60) Provisional application No. 62/681,402, filed on Jun. 6, 2018.

(51) Int. Cl.
*G06Q 40/08* (2012.01)
*G06Q 10/06* (2012.01)

(52) U.S. Cl.
CPC .......... *G06Q 40/08* (2013.01); *G06Q 10/067* (2013.01)

(58) Field of Classification Search
CPC ..................................................... G06Q 40/08
See application file for complete search history.

(56) References Cited

U.S. PATENT DOCUMENTS

| 7,734,245 | B2* | 6/2010 | Ravela | G01W 1/10 342/26 A |
| 7,917,292 | B1* | 3/2011 | Du | G06Q 90/00 702/5 |
| 2004/0186753 | A1 | 9/2004 | Kim et al. | |
| 2013/0132045 | A1* | 5/2013 | Mello | G06F 7/60 703/2 |
| 2013/0332474 | A1* | 12/2013 | Glaubman | G06F 16/22 707/755 |

(Continued)

OTHER PUBLICATIONS

International Search Report and Written Opinion for International Application No. PCT/SG2019/050290 dated Aug. 2, 2019.

*Primary Examiner* — Eric T Wong
(74) *Attorney, Agent, or Firm* — Gardella Grace P.A.

(57) ABSTRACT

In an illustrative embodiment, systems and methods for calculating risk scores for locations potentially affected by catastrophic events include receiving a risk score request for a location, the risk score request including a request for assessment of risk exposure related to a type of catastrophic event. Based on the type of catastrophic event, a data compression algorithm may be applied to a catastrophic risk model representing amounts of perceived risk to an area surrounding the location. In response to receiving the risk score request, a risk score for the location may be calculated that corresponds to a weighted estimation of one or more data points in a compressed catastrophic risk model. A risk score user interface screen may be generated in real-time to present the catastrophic risk score and one or more corresponding loss metrics for the location due to a potential occurrence of the type of catastrophic event.

21 Claims, 13 Drawing Sheets

(56) References Cited

U.S. PATENT DOCUMENTS

| | | | |
|---|---|---|---|
| 2014/0278306 A1* | 9/2014 | Taghavi | G06Q 10/06 |
| | | | 703/6 |
| 2014/0278561 A1 | 9/2014 | Knuffke | |
| 2015/0032598 A1* | 1/2015 | Fleming | G06Q 40/025 |
| | | | 705/38 |
| 2015/0120332 A1 | 4/2015 | Mildenhall et al. | |
| 2015/0235153 A1* | 8/2015 | Du | G06Q 50/163 |
| | | | 705/7.28 |
| 2017/0161859 A1* | 6/2017 | Baumgartner | G06Q 40/06 |
| 2017/0185909 A1 | 6/2017 | Mildenhall et al. | |

\* cited by examiner

Sample of Scored Policies

| Policy | Address | Constr | Bldg. Val | AAL | Reins. Margin | Capital | Attr. Loss | Fixed Expense | Variable Expense | Total Cost | Premium | Cost to Premium |
|---|---|---|---|---|---|---|---|---|---|---|---|---|
| 82756 | 100 Euclid Ave | M | 565,950 | 127 | 154 | 54 | 396 | 75 | 30% | 1,152 | 700 | 164.6% |
| 75967 | ... | M | 275,000 | 65 | 79 | 28 | 193 | 75 | 30% | 628 | 550 | 114.2% |
| 77606 | ... | M | 536,250 | 119 | 146 | 52 | 375 | 75 | 30% | 1,096 | 710 | 154.4% |
| 78268 | ... | M | 516,670 | 94 | 115 | 42 | 362 | 75 | 30% | 983 | 1,200 | 81.9% |
| 82871 | ... | M | 454,190 | 87 | 106 | 39 | 318 | 75 | 30% | 893 | 908 | 98.3% |
| 84407 | ... | M | 438,020 | 91 | 112 | 40 | 307 | 75 | 30% | 893 | 876 | 101.9% |
| 79610 | ... | F | 454,080 | 116 | 140 | 50 | 318 | 75 | 30% | 999 | 908 | 110.0% |
| 78882 | ... | M | 330,000 | 55 | 67 | 25 | 231 | 75 | 30% | 647 | 700 | 92.4% |
| 79838 | ... | M | 209,110 | 36 | 44 | 16 | 146 | 75 | 30% | 453 | 370 | 122.4% |
| 78680 | ... | M | 238,040 | 43 | 53 | 20 | 167 | 75 | 30% | 511 | 390 | 131.0% |
| 76051 | ... | F | 330,000 | 94 | 115 | 38 | 231 | 75 | 30% | 790 | 500 | 158.0% |

Impact Analysis

Base Portfolio: Baseline Inforce Exposures ▼  
Target Portfolio: Exposure Analysis from Baseline Inforce Exposure ▼ 📄 🖨  
Treaty Year: 2017

All Profits ▼ ⟳ ☑ AIR VT53 NT ☑ RMS V15 NT ☑ BLEND — 814

[Go to Charts View]

ECONOMIC COSTS

| Metric | AIR VT53 NT Base | AIR VT53 NT Target | AIR VT53 NT Diff % | RMS V15 NT Base | RMS V15 NT Target | RMS V15 NT Diff % | BLEND Base | BLEND Target | BLEND Diff % |
|---|---|---|---|---|---|---|---|---|---|
| Gross AAL | 32,484,380.1 | 35,927,854.6 | 9.26 % | 42,016,393.6 | 45,932,374.5 | 9.32 % | 37,450,316.9 | 40,930,114.6 | 9.29 % |
| Coded AAL | 9,901,059.3 | 10,300,838.5 | 4.04 % | 0.0 | 0.0 | 0.0 | 4,950,529.6 | 5,150,419.2 | 4.04 % |
| Reinsurance Margin | 18,911,927.3 | 19,469,361.1 | 2.95 % | 0.0 | 0.0 | 0.0 | 9,455,963.7 | 9,734,680.8 | 2.95 % |
| Reinsurance Premium | 28,812,986.6 | 29,770,199.6 | 3.32 % | 0.0 | 0.0 | 0.00 % | 14,406,493.3 | 14,885,099.8 | 3.32 % |
| Capital Cost | 2,972,990.3 | 3,078,950.4 | 3.50 % | 0.0 | 0.0 | 0.0 | 1,490,495.2 | 1,539,476.2 | 3.50 % |
| Total Cat Cost | 54,769,297.8 | 58,476,166.1 | 0.77 % | 42,016,393.6 | 45,932,374.5 | 9.32 % | 48,392,845.7 | 52,204,270.3 | 7.83 % |

ACCUMULATION METRICS

| Metric | AIR VT53 NT Base | AIR VT53 NT Target | AIR VT53 NT Diff % | RMS V15 NT Base | RMS V15 NT Target | RMS V15 NT Diff % | BLEND Base | BLEND Target | BLEND Diff % |
|---|---|---|---|---|---|---|---|---|---|
| PML - 100 | 375,142,570.8 | 310,366,025.3 | 1.29 % | 642,778,777.5 | 694,604,016.7 | 7.89 % | 509,460,674.2 | 537,435,056.0 | 5.50 % |
| PML - 250 | 538,532,058.8 | 600,714,947.9 | 0.70 % | 1,031,506,726.3 | 1,036,783,699.0 | 6.52 % | 814,019,391.8 | 849,724,318.9 | 4.39 % |
| TVsR - 100 | 674,401,982.7 | 711,017,498.7 | 5.43 % | 1,273,349,966.4 | 1,330,434,778.3 | 4.49 % | 973,875,514.5 | 1,020,751,138.5 | 4.81 % |
| TVsR - 250 | 507,364,682.1 | 1,071,553,163.5 | 6.57 % | 1,563,413,428.0 | 2,038,015,504.5 | 2.78 % | 1,435,389,055.1 | 1,555,284,589.2 | 4.71 % |
| 5D | 98,125,161.3 | 105,112,717.0 | 6.25 % | 212,652,421.5 | 218,516,789.7 | 2.76 % | 155,743,791.4 | 161,814,753.4 | 3.90 % |

*All metrics in Ones of US Dollars

FIG. 8B

SYSTEMS, METHODS, AND PLATFORM FOR ESTIMATING RISK OF CATASTROPHIC EVENTS

RELATED APPLICATIONS

This application claims priority to U.S. Provisional Patent Application Ser. No. 62/681,402, entitled "Systems, Methods, and Platform for Estimating Risk of Catastrophic Events," filed Jun. 6, 2018.

This application is related to the following prior patent applications directed to catastrophic risk estimation and management: U.S. patent application Ser. No. 13/804,505, entitled "Computerized System and Method for Determining Flood Risk," filed Mar. 14, 2013; and U.S. patent application Ser. No. 15/460,985, entitled "Systems and Methods for Performing Real-Time Convolution Calculations of Matrices Indicating Amounts of Exposure," filed Mar. 16, 2017. All above identified applications are hereby incorporated by reference in their entireties.

BACKGROUND

The present technology relates to determining likelihood of various natural and manmade catastrophic events (e.g., tornadoes, hurricanes, floods, wild fires, earthquakes, terrorist attacks) in given geographic locations and potential amounts of risk to properties and other structures posed by such catastrophic events.

It is known that models or other computer applications may be used to assess the potential liabilities of catastrophic events. Certain companies, such as insurance companies, may find information provided by these models/applications useful in determining their potential liability (i.e., risk exposure) based on the occurrence of the event. These models/applications use, generate and store large amounts of data that need to be processed and analyzed to facilitate the determination of its potential liabilities based on the event. Additionally, catastrophic modeling software typically requires specialized training and a server installation. The existing methods are also time consuming and are unable to provide real-time assessments of risk exposure. In some instances, underwriters send insurance application information to an analyst trained in using catastrophic modeling software, which can take twenty-four to forty-eight hours to be processed, analyzed, and returned to the underwriter. As such, there is a need and desire for a better system and method for determining risk exposure of properties and other structures based on the occurrence of an event such as a catastrophic event.

SUMMARY OF ILLUSTRATIVE EMBODIMENTS

The forgoing general description of the illustrative implementations and the following detailed description thereof are merely exemplary aspects of the teachings of this disclosure, and are not restrictive.

In some embodiments, systems and methods for calculating risk scores for locations potentially affected by catastrophic events can include receiving a risk score request for a location in which the risk score request can include a request for assessment of risk exposure related to a type of catastrophic event. Based on the type of catastrophic event, a data compression algorithm may be applied to a catastrophic risk model representing amounts of perceived risk to an area surrounding the location. In response to receiving the risk score request, a risk score for the location can be calculated that corresponds to a weighted estimation of one or more data points in a compressed catastrophic risk model. A risk score user interface screen can be generated in real-time that presents the catastrophic risk score and one or more corresponding loss metrics for the location due to a potential occurrence of the type of catastrophic event.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 7 is a diagram illustrating inputs and outputs of the catastrophic risk determination system;

FIGS. 8A-8B are screen shots of example risk analysis user interface screens;

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Figure 1:
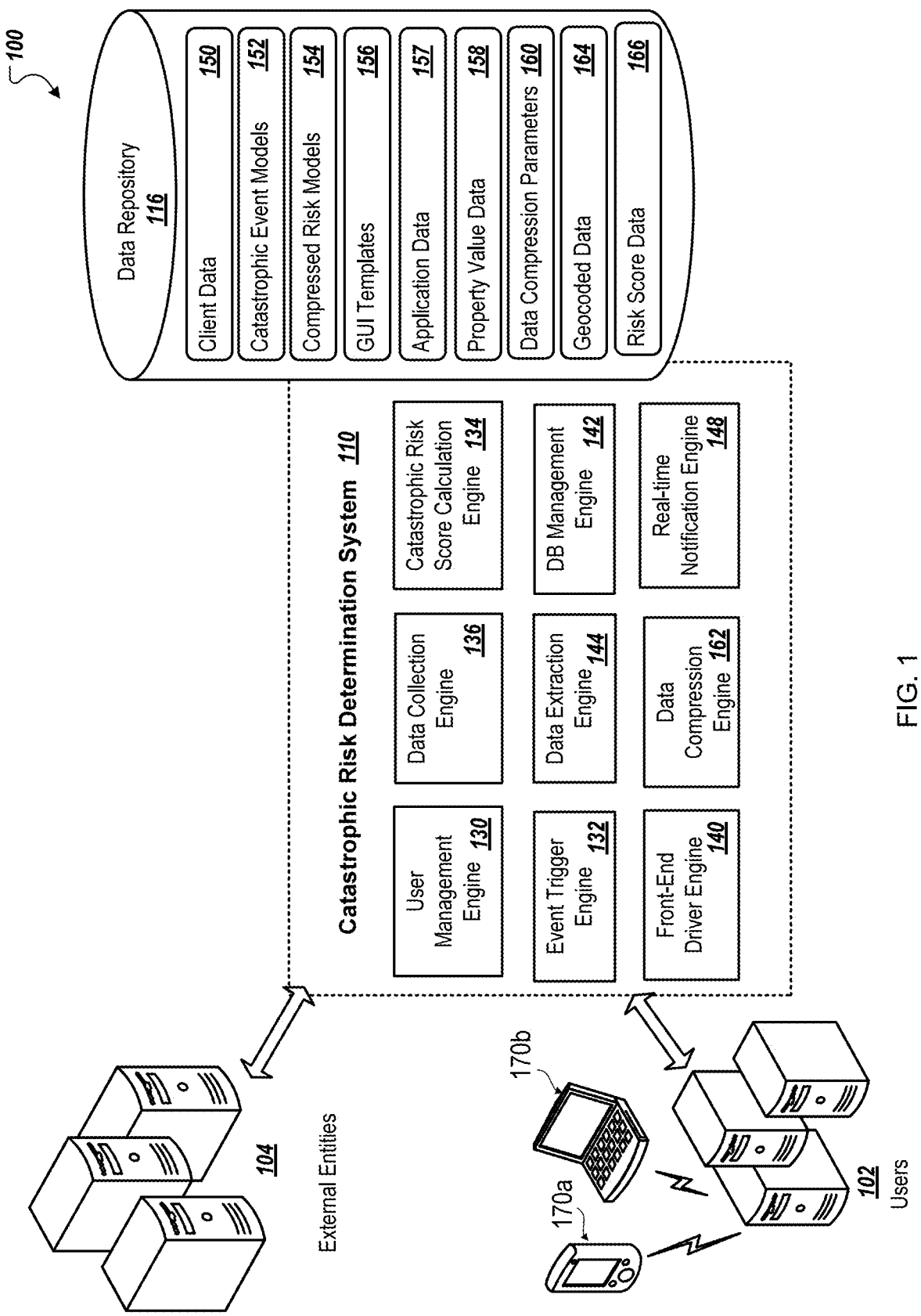
FIG. 1 is a block diagram of an example environment for a catastrophic risk determination system.

FIG. 1 is a diagram of an example environment 100 for a catastrophic risk determination system 110. The diagram illustrates relationships, interactions, computing devices, processing modules, and storage entities used to gather, generate, store, and distribute the information necessary to determine amounts of risk to properties posed by various natural and manmade catastrophic events (e.g., tornadoes, hurricanes, floods, wild fires, earthquakes, terrorist attacks), which can be used to determine the costs associated with such losses to catastrophic loss insurance providers.

In some implementations, the catastrophic risk determination system 110 may gather and process information from external entities 104 such as catastrophic event model providers, property value providers, and geocoding data providers in order to provide, in response to receiving a request, real-time catastrophic risk assessments (costs due to losses from a potential catastrophic event, for example) to one or more users 102 (e.g., underwriters for catastrophic risk insurance policies). In some examples, the users 102 may use the information to determine whether or not to write an insurance policy for a property at a particular location based on a catastrophic risk score calculated by the catastrophic risk determination system 110. Additionally, the catastrophic risk determination system 110 may use the calculated catastrophic risk score to generate a client underwriting analysis, which can further assist the user in the policy writing decision process. In some implementations, the catastrophic risk determination system 110 applies a data compression algorithm to catastrophic model data received from the external entities 104, which allows the system 110 to calculate catastrophic risk scores in real time in response to a received user request. Generating catastrophic risk scores from compressed data sets provides a substantial technical improvement over conventional catastrophic risk determination systems in both processing speed and overall risk score accuracy due to how the modeling data is compressed, which is discussed in further detail below. Further, the methods described herein for compressing catastrophic risk models greatly reduce data storage demands on the catastrophic risk determination system 110 because of the strategic selection of data points that are retained as part of the compressed data models. Further the methods described herein for accurately estimating fitted measures from the compressed data models enable the system 110 to retain smaller numbers of data points in the compressed data models, which improves system processing speeds because of the reduced data processing load and further reduces data storage requirements.

In certain embodiments, users 102 may connect to the catastrophic risk determination system 110 via a number of computing devices distributed across a large network that may be national or international in scope. The network of users 102 can be separate and independent from networks associated with other entities in the risk determination environment 100, such as the external entities 104. In addition, the data handled and stored by the users 102 may be in a different format than the data handled and stored by the other entities of the risk determination environment 100. In some implementations, the users 102 may include, in some examples, insured personnel, brokers, insurance carriers, or any other person providing inputs to the catastrophic risk determination system 110. For example, underwriters for insurance carriers who underwrite catastrophic event insurance policies for homeowners may input insurance application information for a property to the system 110 and receive, in real-time, a catastrophic risk score indicating an amount of risk associated with writing a catastrophic risk insurance policy for the property.

In some implementations, the catastrophic risk score can be calculated by the catastrophic risk determination system 110 in real-time in response to receiving application data 157 inputs from the users 102 at an external device 170. Additionally, the users 102 may also provide client data 150 to the system 110, which may include characteristics and statistics associated an insurance policy portfolio of a particular insurance carrier or broker such as average and total coverage amounts, claims data, reinsurance statistics, and premium amounts. In other examples, the system 110 may automatically calculate portfolio statistics for a client in response receiving portfolio data file uploads from a user 102. In some examples, the client data 150 may also include at least one type of preferred catastrophic risk model. Each type of catastrophic event, in some implementations, may have more than one catastrophic risk model and/or a blend of more than one model that can be used to calculate the catastrophic risk score. For example, tornado risk may be calculated using a model and/or algorithm provided by or based on a tornado model and/or algorithm developed by AIR Worldwide of Boston, Mass. or by Risk Management Solutions, Inc. of Silicon Valley, Calif. The system 110 can calculate catastrophic risk scores for the users 102 for each type of catastrophic event based on the preferred model.

External entities 104, in some implementations, include a number of computing devices distributed across a large network that may be national or international in scope. The network of external entities can be separate and independent from networks associated with other entities in the risk determination environment 100, such as the users 102. In addition, the data handled and stored by the external entities 104 may be in a different format than the data handled and stored by the other participants of in the risk determination environment 100. The external entities 104 can include any type of external system that provides data regarding catastrophic event occurrences such as government or private weather monitoring systems, first responder data systems, or law enforcement data systems. In some embodiments, external entities 104 may supply data into the risk determination system 110 (e.g., on a periodic basis or responsive to occurrence of a catastrophic event). In some embodiments, the risk determination system 110 connects to one or more external entities 104 to request or poll for information. For example, the risk determination system 110 may be a subscriber of information supplied by one or more of the external entities 104, and the risk determination system 110 may log into one or more of the external entities 104 to access information.

In some examples, the external entities 104 may include catastrophic event model providers such as the U.S. Federal Emergency Management Agency (FEMA). Instead of or in addition to FEMA, the external entities 104 may also include other government agencies (of the U.S. or another country) or may be nongovernmental public or private institutions that generate catastrophic event models 152 for any type of natural or manmade catastrophe. In an aspect where the catastrophic event is flooding, the external entities 104 may offer a specific set of flood risk products including, but not limited to, Flood Insurance Rate Maps (FIRMs) that may generally show base flood elevations, flood zones, and floodplain boundaries for specific geographic areas (the entirety of the U.S., for example). In some examples, the catastrophic event model providers may also offer periodic and/or occasional updates to catastrophic event models 152 due to changes in geography, construction and mitigation activities, climate change, and/or meteorological events.

In some implementations, the external entities 104 may also include property value providers that may provide inputs to the catastrophic risk determination system 110 that include property values for properties that are associated with received insurance applications. For example, property value data 158 received from the property value providers 106 may be based on public records (tax assessments, real estate sales, and the like), multiple listing service (MLS), or may be based on specific and, in some cases, proprietary appraisals of individual properties and/or groups of properties. In some examples, the catastrophic risk determination system 110 may pull or extract property value data 158 from the property value providers using web harvesting or web data extraction from public or private websites. Alternatively, the catastrophic risk determination system 110 may operate under a contractual agreement with one or more property value providers to provide property value data 158. The property value data 158 may also be provided by the users 102 as part of an insurance policy application.

In some embodiments, the catastrophic risk determination system 110 may include one or more engines or processing modules 130, 132, 134, 136, 140, 142, 144, 148, 162 that perform processes associated with condensing catastrophic risk models and calculating catastrophic risk scores based on the condensed risk models in response to a request received from a user 102. In some examples, the processes performed by the engines of the catastrophic risk determination system 110 can be executed in real-time in order to provide an immediate response to a system input. In addition, the processes can also be performed automatically in response to a process trigger that can include a specific day or time-of-day or the reception of data from a data provider (e.g., one of the external entities 104 such as a catastrophic event model provider or property value provider), one of the users 102, or another processing engine.

In some implementations, the catastrophic risk determination system 110 may include a user management engine 130 that may include one or more processes associated with providing an interface to interact with one or more users (e.g., individuals employed by or otherwise associated with users 102) within the risk determination environment 100. For example, the user management engine 130 can control connection and access to the catastrophic risk determination system 110 by the users 102 via authentication interfaces at one or more external devices 170 of the users 102. In some examples, the external devices 170 may include, but are not limited to, personal computers, laptop/notebook computers, tablet computers, and smartphones.

The catastrophic risk determination system 110, in certain embodiments, may also include a data collection engine 136 that controls the gathering of data from the external entities 104 such as the catastrophic model providers and property value providers. In some examples, the data collection engine 136 can typically receive data from one or more sources that may impact lead generation for users 102. For example, the data collection engine 136 can perform continuous, periodic, or occasional web crawling processes to access updated data from the external entities 104.

In addition, the catastrophic risk determination system 110 may include, in some implementations, a database management engine 142 that organizes the data received by the catastrophic risk determination system 110 from the external entities 104. In some examples, the database management engine 142 may also control data handling during interaction with users 102. For example, the database management engine 142 may process the data received by the data collection engine 136 and load received data files to data repository 116, which can be a database of data files received from the one or more data sources. In one example, the database management engine 142 can determine relationships between the data in data repository 116. For example, the database management engine 142 can link and combine received property value data 158 with geocoded data 164 associated with the properties. In addition, the database management engine 142 may perform a data format conversion process to configure the received data into a predetermined format compatible with a format of the files within data repository 116.

In some implementations, the catastrophic risk determination system 110 may also include a real-time notification engine 148 that ensures that data input to the catastrophic risk determination system 110 is processed in real-time. In addition, the processes executed by the real-time notification engine 148 ensure interactions between the users 102 and the catastrophic risk determination system 110 are processed in real-time. For example, the real-time notification engine 148 may output alerts and notifications to the users 102 via user interface (UI) screens when data associated with the users 102 have been received by the data collection engine 136.

In some examples, the catastrophic risk determination system 110 may also include an event trigger engine 132, which can manage the flow of data updates to the catastrophic risk determination system 110. For example, the event trigger engine 132 may detect updates to catastrophic event models 152, application data 157, property value data 158, geocoded data 164, or any other type of data collected or controlled by the catastrophic risk determination system 110. The event trigger engine 132 may also detect modifications or additions to the files of the data repository 116, which may indicate that new or updated data has been received. When a data update is detected at data repository 116, the event trigger engine 132 loads the updated data files to a data extraction engine 144. The event trigger engine 132 operates in real-time to update the data extraction engine 144 when updated data is received from the data sources. In addition, the event trigger engine 132 operates automatically when updated data is detected at the data repository 116. In addition, the data extraction engine 144 extracts data applicable to the catastrophic risk determination system 110 from data files received from the data sources.

In some implementations, the catastrophic risk determination system 110 may also include a front-end driver engine 140 that controls dissemination of data and interactions with users 102 through one or more UI screens that may be output to the external devices 170 in response to queries received from the users 102. For example, the users 102 may input insurance policy application data 157 at a UI screen as a query for a catastrophic risk score associated with a property specified in the application. In another example, the users 102 can input application data 157 for multiple properties simultaneously by uploading a tabular spreadsheet or data file that includes application data 157 for multiple properties. For example, the properties included in the tabular spreadsheet may be properties associated with a particular insurance policy portfolio maintained by a user 102. In response to receiving the inputs at the UI screen, the front-end driver engine 140 may output, in real-time, a catastrophic risk score and/or corresponding loss amounts associated with the one or more properties and the user 102 submitting the query. In some implementations, the loss amounts may include average annual loss (AAL), reinsurance margin, and net capital costs associated with the indicated type of catastrophic event.

In some implementations, the front-end driver engine 140 may cause geocoded data 164 (e.g., maps corresponding to a location of an indicated property in the submitted application) to be dynamically displayed on the front-end UI to allow a user to interact with the information stored in the data repository 116. In addition, the geospatial data included in the UI screen may also include a geocoded description of the property that may include latitude/longitude coordinates, address, building type, and geocode accuracy. In one example, the front-end of the catastrophic risk determination system 110 may be implemented as a web application that a user (e.g., insurance provider 102) accessed through a web browser running on external devices 170. In some embodiments, the front-end of the system 110 may also be a full-fledged application or mobile app that runs on external devices.

Figure 2:
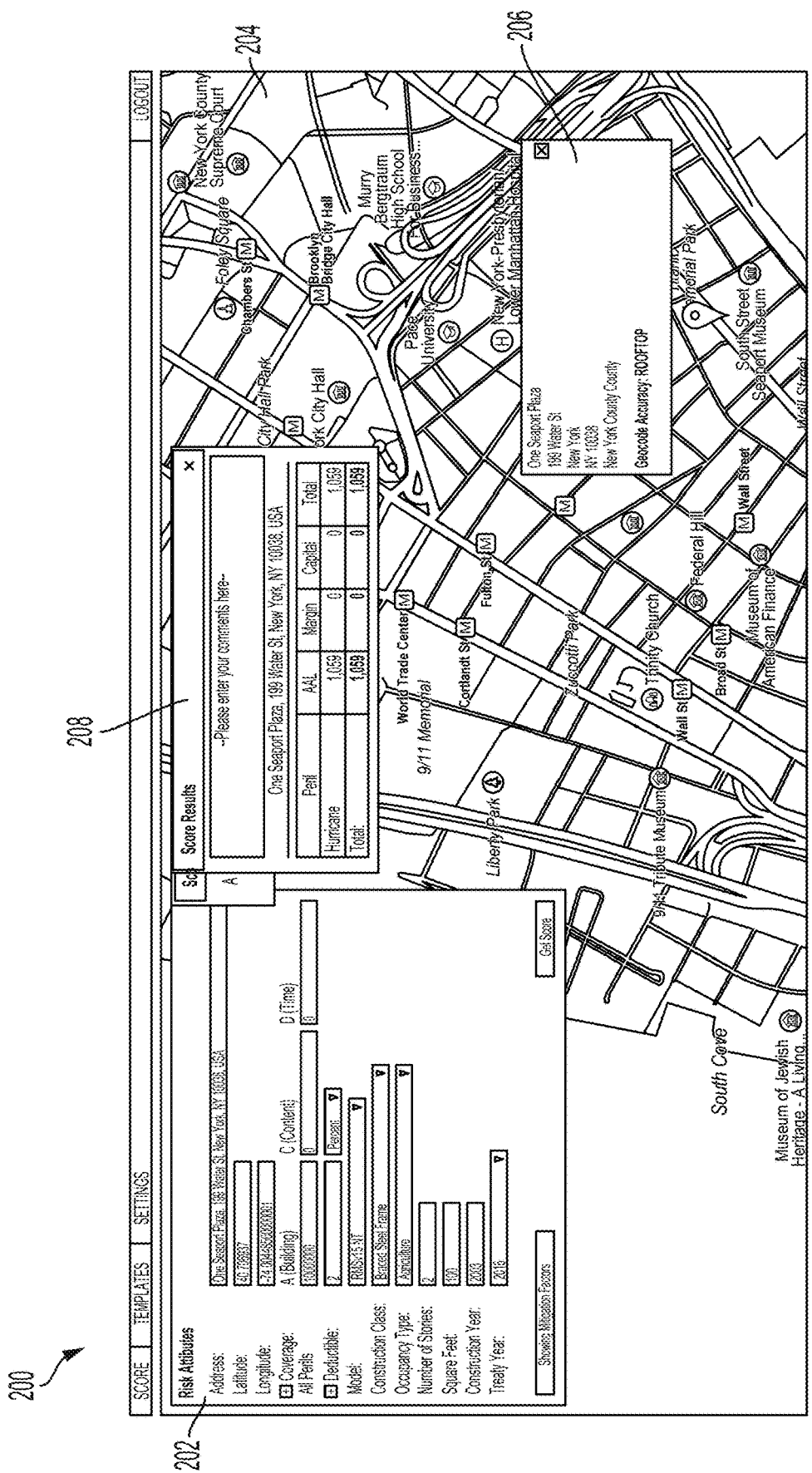
FIG. 2 is a screen shot of an example catastrophic risk score user interface including an application data input window and a catastrophic risk output window.

For example, FIG. 2 is a screen shot of an example catastrophic risk score user interface screen 200 including an application data input window 202 and a catastrophic risk score output window 208. In some implementations, a user 102, such as an underwriter seeking to write a catastrophic risk policy for a particular property, may interface with the UI screen 200 at an external device 170 by inputting risk attributes for the property at the application data input window 202. In some implementations, the user 102 may manually populate each of the input fields within the application data input window 202, which may include property location, insurance coverage amounts for each type of catastrophic event (peril), deductible amounts, preferred catastrophic model, and building characteristics (e.g., construction class, occupancy type, number of stories, square feet, construction year).

In other examples, the user 102 may populate one input field or a portion of the input fields, and the system 110, in real-time, may automatically populate the remaining input fields in the application data input window 202. For example, in response to receiving a user input for the address, the front-end driver engine 140 may automatically populate the longitude/latitude and building characteristics for the location based on the geocoded data 164 stored in the data repository 116. Additionally, based upon authentication information provided by the user 102, the front-end driver engine 140 may automatically populate the preferred catastrophic model details based upon the client data 150 for the user 102 stored in the data repository 116. In some implementations, based on the location information input at the application data input window 202, the front-end driver engine 140 may dynamically adjust a portion of a map 204 displayed on the UI screen 200 so that the indicated location is within view. The front-end driver engine 140 may also cause a location marker 206 to be inserted within the displayed map 204 so that the location indicated in the application data input window 202 is visible to the user 102 on the UI screen 200. In some examples, the location marker 206 may include location information about the property as well as a geocode accuracy level for the property.

In some examples, in response to receiving a submission of risk attributes input at the application data input window 202, the system computes a catastrophic risk score, which can be output in real-time to catastrophic risk score output window 208. In some implementations, the catastrophic risk score may be converted into one or more loss metrics that are tailored to the specific user 102 submitting the query. The loss metrics may include at least one of AAL, reinsurance margin, net capital costs, and total costs. Additionally, the catastrophic risk determination system 110 may simultaneously compute catastrophic risk scores and loss metrics for multiple types of catastrophic events (perils) for the indicated location. For example, the loss metrics associated with each type of peril may be presented in the catastrophic risk score output window 208 in tabular form.

In some implementations, each of the components of the UI screen 200 (application data input window 202, catastrophic risk score output window 208, location marker 206, map 204) may be constructed in a generic format (e.g., Extensible Markup Language (XML)) to provide for compatibility with user applications that integrate the functionality of catastrophic risk determination system 110 into existing software or web applications.

Returning to FIG. 1, in some implementations, the front-end driver engine 140 may dynamically configure one or more stored GUI templates 156 based on the type of request received from a user 102. For example, the front-end driver engine 140, in response to receiving a request for a risk exposure growth assessment for a particular location (e.g., state, county, or postal code), may configure data outputs received from a catastrophic risk score calculation engine 134 into one or more UI screens that show the impact of updated risk exposure models for a particular type of catastrophe to a user's insurance policy portfolio, which may include geographic and/or tabular UI screens (see FIGS. 8A-8B).

Additionally, the front-end driver engine 140 may also dynamically configure the UI screens output to the external devices 170 based on the type of catastrophic event associated with a query. In some implementations, certain types of catastrophic events, such as flooding events, may have an amount of volatility associated with the calculated catastrophic risk score based on size of the property, distance to a flood source (e.g., a body of water), and change in elevation within the property (for example, one building on a property may be positioned on top of a hill and may not be as vulnerable to a flood as a building on the property that sits at a lower elevation). For catastrophic risk scores that are prone to having higher volatilities, the front-end driver engine 140 may output a GUI screen to the external devices 170 of the users 102 that includes a volatility score along with an overall catastrophic risk score (see FIG. 9).

The catastrophic risk determination system 110, in some implementations, may also include a data compression engine 162 that compresses data sets defining the catastrophic event models 152 into compressed data sets, referred to herein as compressed risk models 154. In addition, each of the compressed risk models 154 represents a subset of the data points of its corresponding catastrophic event model 152. Because the catastrophic risk event models 152 received from catastrophic event model providers can include millions of data points, calculating catastrophic risk scores directly from the received catastrophic event models 152 can be time-consuming and burdensome on available processing resources. In some examples, the data compression engine 162 can apply a spatial data compression algorithm that reduces millions of spatial data points in a catastrophic model data set down to a compressed risk model 154 having less than 150,000 data points. In some examples, the data compression algorithm provides a best possible estimate of insurance underwriting costs for each of the data points in a catastrophic event model given a constraint on the size of the compressed data set.

Figures 3A, 3B:
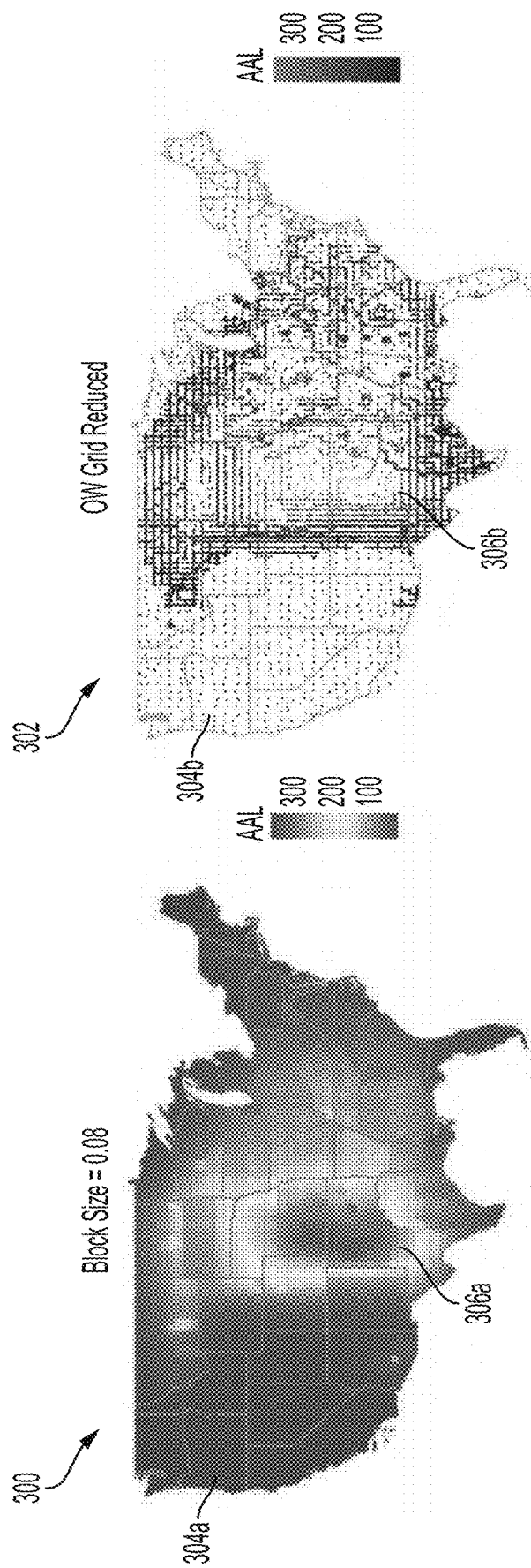
FIG. 3A is a graphical representation of a catastrophic risk model for convective storms.
FIG. 3B is a graphical representation of a compressed risk model of the catastrophic risk model of FIG. 3A.

For example, FIG. 3B illustrates a graphical representation of a compressed risk model 302 of a catastrophic risk model 300 for convective storms (e.g., tornados) shown in FIG. 3A. In the illustrated example, the catastrophic risk model 300 includes 8.1 million data points and the compressed risk model 302 includes 55,000 data points. In some implementations, both the original data set for the catastrophic risk model 300 and the compressed data set for the compressed risk model 302 can include spatial data containing two primary dimensions. A first dimension, in some examples, may correspond to a location that specifies a point and can itself include any number of dimensions. A second dimension of the original and compressed data sets may correspond to a measure, which is a quantity that depends on the location. In one example, the measure may be a cost of underwriting catastrophic risk due to losses from convective storms. In another example, the measure may be average annual rainfall or another climatic statistic such as average air pressure, wind speed, and/or temperature.

In some implementations, the data points in the compressed data sets can be used to determine fitted measures for locations in the original data set as well as for locations not in the original data set. The compressed data sets may also be used to generate additional, related measures for the locations. In one example, an original data set may include a measure of average cost of underwriting due to catastrophic risk by location. While the compressed data set also indicates costs of underwriting, it can also be used to generate a distribution of costs of underwriting due to catastrophic risk by location. Compressed data sets generated from compressions algorithms like JPEG are not able to generate loss distributions like the compressed risk models 154 described herein because JPEG data sets fit curves to the pattern of values in the data matrix. For example, JPEG, GIF, PNG, and other similar compression formats provide color values for each pixel location within an image grid. On the other hand, the compressed data sets generated by the data compression engine 162 and used by the catastrophic risk determination system 110 for generating catastrophic risk scores includes data grids in which each grid location contains a list of values and corresponding probabilities for those values, which is referred to as a loss distribution. In some implementations, these loss distributions can be used by the system 110 to more accurately and efficiently compute the catastrophic risk score and any additional loss metrics associated with a user query.

In some implementations, the catastrophic risk model 300 can be reduced by the data compression engine 162 into the compressed risk model 302 by applying compression parameters that tolerate greater amounts of error in areas with low measures (for example, low costs of underwriting due to catastrophic risk) than areas with high measures. In some examples, the data compression algorithm applied by the data compression engine 162 can be configured to optimize or strategically position data points retained in the compressed data so that more data is lost, and hence more error introduced, in areas where large errors are of relatively low concern with respect to making insurance underwriting decisions. For example, the system 110 may strategically remove data points from the compressed data model at locations where the error tolerance is greater than a predetermined threshold.

For example, as shown in FIGS. 3A-3B, a western region 304a of the catastrophic risk model 300 represents an area of low underwriting costs due to fewer occurrences of catastrophic convective storms. Therefore, a western region 304b of the compressed risk model 302 includes fewer data points which are farther apart from one another than data points in a middle region 306b of the compressed risk model 302 where greater numbers of convective storms occur and cause greater catastrophic losses. However, the absolute value of cost measures is low enough in the western region 304 and other regions with low convective storm losses that convective storm costs may be of minor or no concern to users in this context, which results in few convective storm insurance policies being written for properties in the western region 304. On the other hand, the middle region 306b of the compressed risk model 302 can have a greater density of data points than the western region 304b due to the higher underwriting costs and higher occurrences of convective storms, which provides greater estimation accuracy of the values in the western region 306a in the catastrophic risk model 300. In some implementations, regions having greater variation of loss amounts over a given distance or area may have more data points in the compressed risk model 302 than regions that have less variation of loss amounts in order to provide accurate loss amounts for received queries that correspond to areas that experience large fluctuations in predicted underwriting costs.

Figure 4:
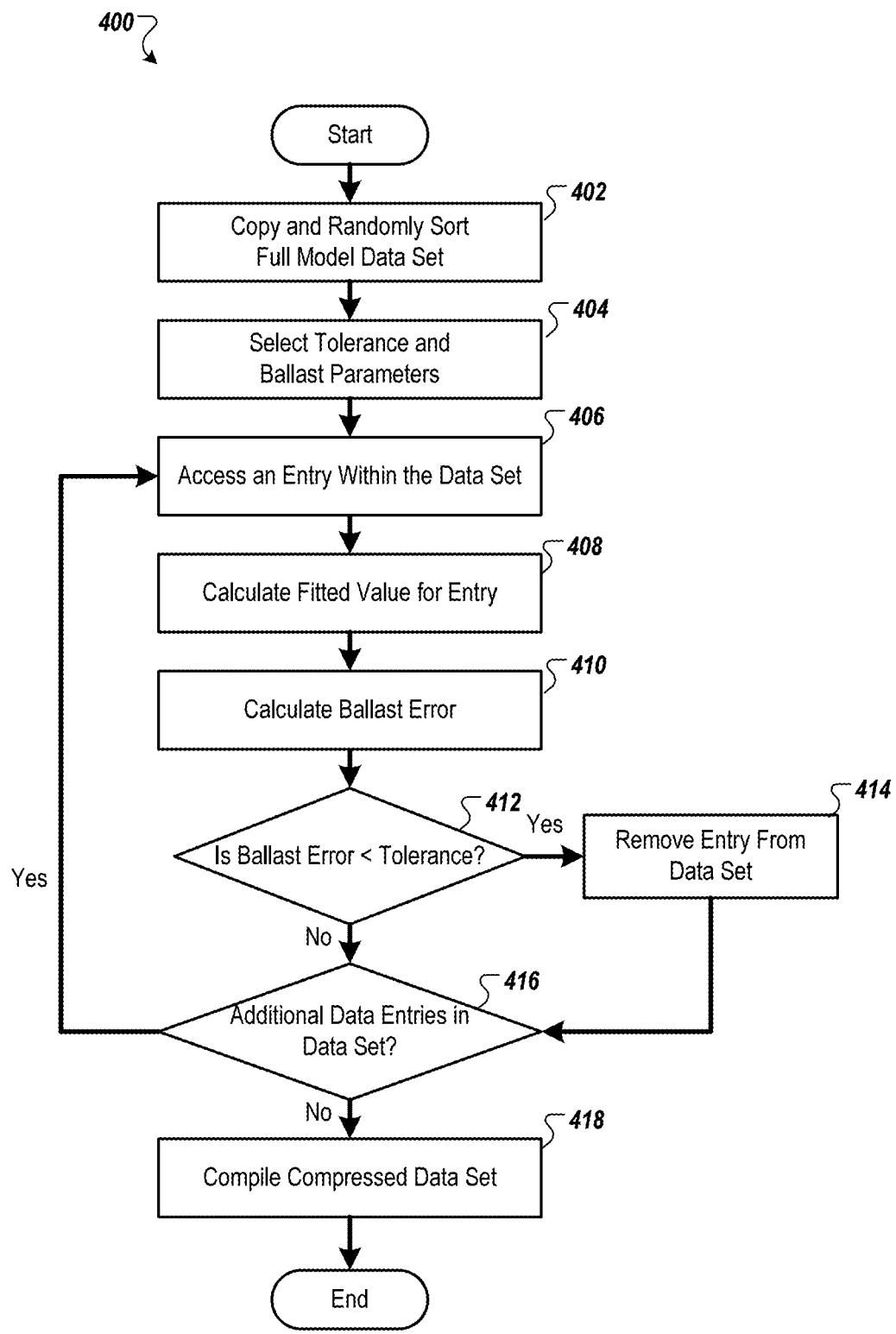
FIG. 4 is a flow chart of an example method for compressing data.

FIG. 4 illustrates a flow chart of an example method 400 for generating a compressed risk model 154 from a catastrophic event model 152 using a data compression algorithm in response to receiving an updated catastrophic event model 152 from an external entity 104, such as a catastrophic event model provider (e.g., FEMA). In some examples, the method 400 is performed by the data compression engine 162 of the catastrophic risk determination system 110.

In some implementations, the method 400 commences with copying the entries from the data set representing the catastrophic event model 152 into a second data set (402) and selecting error tolerance and ballast parameters for compressing the data set entries into a compressed data set (404). The tolerance and ballast parameters, in some examples, may be stored as data compression parameters 160 and may be provided to the system 110 by users 102 via external devices 170. In some implementations, the data compression parameters 160 may vary based on the user 102 submitting a catastrophic risk score query. In some examples, ballast parameter values may be determined based on an amount of allowed error tolerance in different geographic regions based on loss amounts due to a type of catastrophic event in the geographic regions and/or an amount of variation in data point values in a given geographic area. In some implementations, accuracy of the compression algorithm may be more important in areas with high loss values (e.g., losses due to hurricanes along the Florida coast) than in areas with low loss values (e.g., losses due to hurricanes in Wyoming). The ballast parameter values can depend on a desired compression level and actual loss values on the grid. For example, higher ballast values result in more compression (and less accuracy) than lower ballast values. In some examples, the desired compression level can be based on an amount of storage capacity of data repository 116 and a number of compressed data models 154 to be stored.

In some implementations, for an entry in the second data set (406), a fitted value is calculated for that entry as if it were not in the data set (408). Details regarding calculating a fitted measure value are discussed further below. In some examples, the fitted measure value can be an estimated measure value for a location using spatial interpolation based on values of one or more closest data entries, which may each be weighted based on their distance from the location. For the fitted measure value that is calculated for the data entry, in some examples, a ballast error calculation is performed (410). In some implementations, the ballast calculation can be described by the following equation:

$$\text{Ballast Error} = \frac{\text{Fit Value}}{(\text{Ballast} + \text{Actual Value})} \quad (1)$$

If the ballast error is less than the tolerance parameter (412), then in some implementations, the current data entry is discarded (414). Stated another way, in some examples, data entries for locations may be discarded when the remaining entries in the data set can be used to estimate the fitted measure value within a predetermined tolerance.

In some examples, if all of the data entries in the second data set have been processed (416), then the remaining data points that have not been discarded may, in some implementations, be compiled into a compressed data set representing a compressed risk model 154 that is stored in the data repository 116 (418).

Although illustrated in a particular series of events, in other implementations, the steps of the data compression process 400 may be performed in a different order. For example, compiling the compressed data set (418) may be performed before, after, or simultaneously with calculating the ballast error for one or more of the data points (410). For example, the compressed data set may be continuously populated with data points with each successive ballast error calculation. Additionally, in other embodiments, the process may include more or fewer steps while remaining within the scope and spirit of the data compression process 400.

Figure 5:
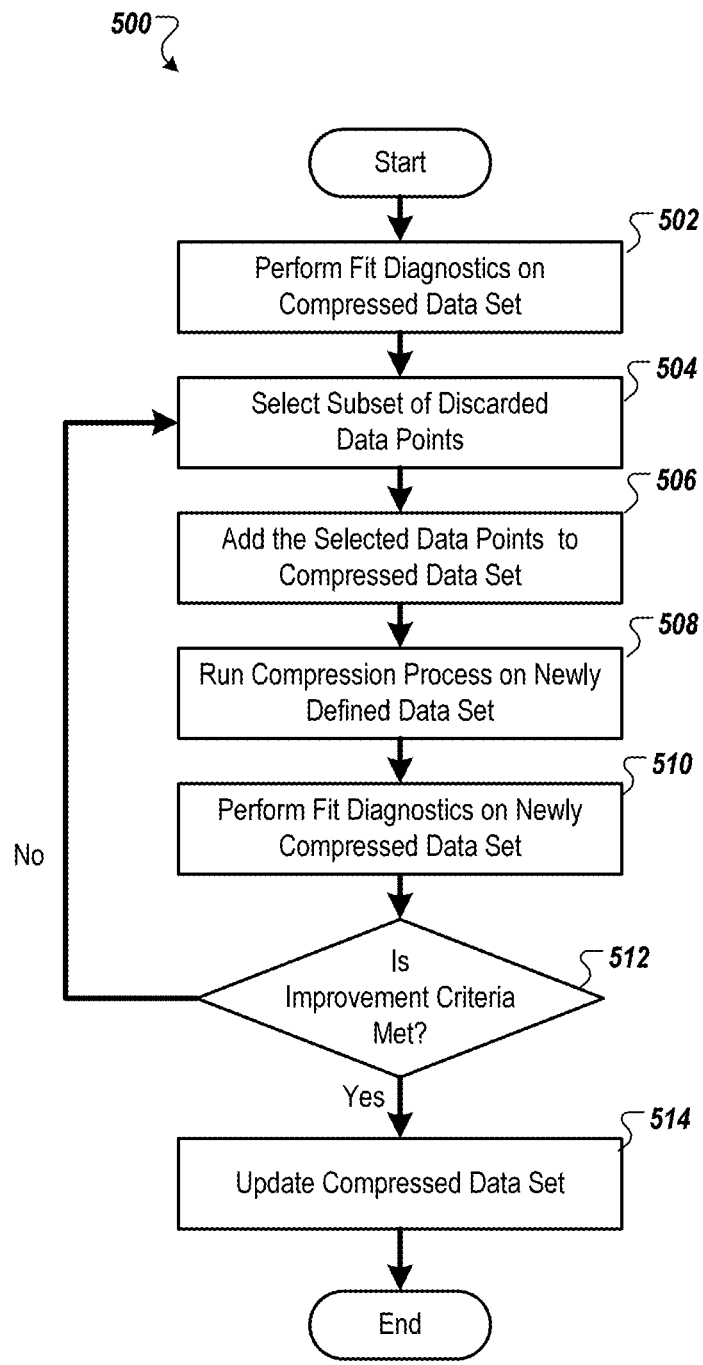
FIG. 5 is a flow chart of an example method for enhancing data compression.

FIG. 5 illustrates a flow chart of an example method 500 for enhancing accuracy of a compressed risk model 154 using an enhanced data compression algorithm. In some implementations, the method 500 may be performed on a compressed risk model 154 after performance of the data compression process 400, which generates a compressed risk model 154. In other examples, the method 500 may be performed by default or may be situationally performed based on a total amount of error present in a data set for a compressed risk model 154. In some examples, the method 450 is performed by the data compression engine 162 of the catastrophic risk determination system 110.

In some implementations, the method 500 commences with performing a diagnostic fit calculation for a compressed data set (502) generated by the data compression process 400. In some examples, the diagnostic fit calculation and the parameters used during the calculation may be dependent on a type of application or catastrophe. In one example, the diagnostic fit calculation may include calculating a percentage difference between fitted measure values from a compressed data set and actual measures for all of the locations in an original data set for a catastrophic event model 152.

In some examples, the data compression engine 162 may select a subset of data points that were discarded during performance of the data compression process 400 (504). The selected data points, in some implementations, may be added to the compressed data set (506), and the data compression process 400 may be reperformed on the compressed data set that includes the selected data points (508). In some examples, the diagnostic fit calculation may be performed on the newly compressed data set (510), and if predetermined accuracy improvement criteria are met (512), then the compressed data set, in some implementations, may be updated to include the selected data points (514). In some examples, the improvement criteria may include a predetermined amount of improvement in the diagnostic fit calculation performed at 510 over the diagnostic fit calculation performed at 502.

Although illustrated in a particular series of events, in other implementations, the steps of the data compression enhancement process 500 may be performed in a different order. For example, determining whether the improvement criteria are met (512) may be performed before, after, or simultaneously with updating the compressed data set (514). Additionally, in other embodiments, the process may include more or fewer steps while remaining within the scope and spirit of the data compression enhancement process 500. In some examples, the method 500 provides a technical solution to the technical problem of automatically and dynamically performing quality control processes on the compressed data models to ensure that the system 110 can accurately estimate fitted measures for any of the data points that were discarded from the original catastrophic risk models.

Returning to FIG. 1, in some implementations, the catastrophic event determination system may also include a catastrophic risk score calculation engine 134 that, in real-time response to a query received from a user 102, calculates a catastrophic risk score and any additional loss metrics and assessment calculations associated with the query. In one example, the query may include submitting application data 157 via the catastrophic risk score UI screen 200 (FIG. 2). In some examples, the loss metrics may include at least one of AAL, reinsurance margin, net capital costs, and total costs due to loss, which may be generated based on the calculated catastrophic risk score and individual client data 150.

In some examples, the catastrophic risk score calculation engine 134 may calculate the catastrophic risk score from a compressed risk model 154 associated with the location and type of catastrophic event from the query. In some embodiments, using a compressed risk model 154 rather than its corresponding catastrophic event model 152 provides for more rapid calculation of the catastrophic risk score due to the compressed risk model 154 having significantly fewer data points to process than the catastrophic event model 152 (for example, 55,000 data points vs. 8.1 million data points in one instance). In some implementations, the catastrophic risk score represents a weighted estimate of one or more closet data points from the corresponding compressed risk model 154. In some examples, the calculated fitted measure, risk score, and any additional loss metrics are stored in the data repository 116 as risk score data 166.

Figure 6:
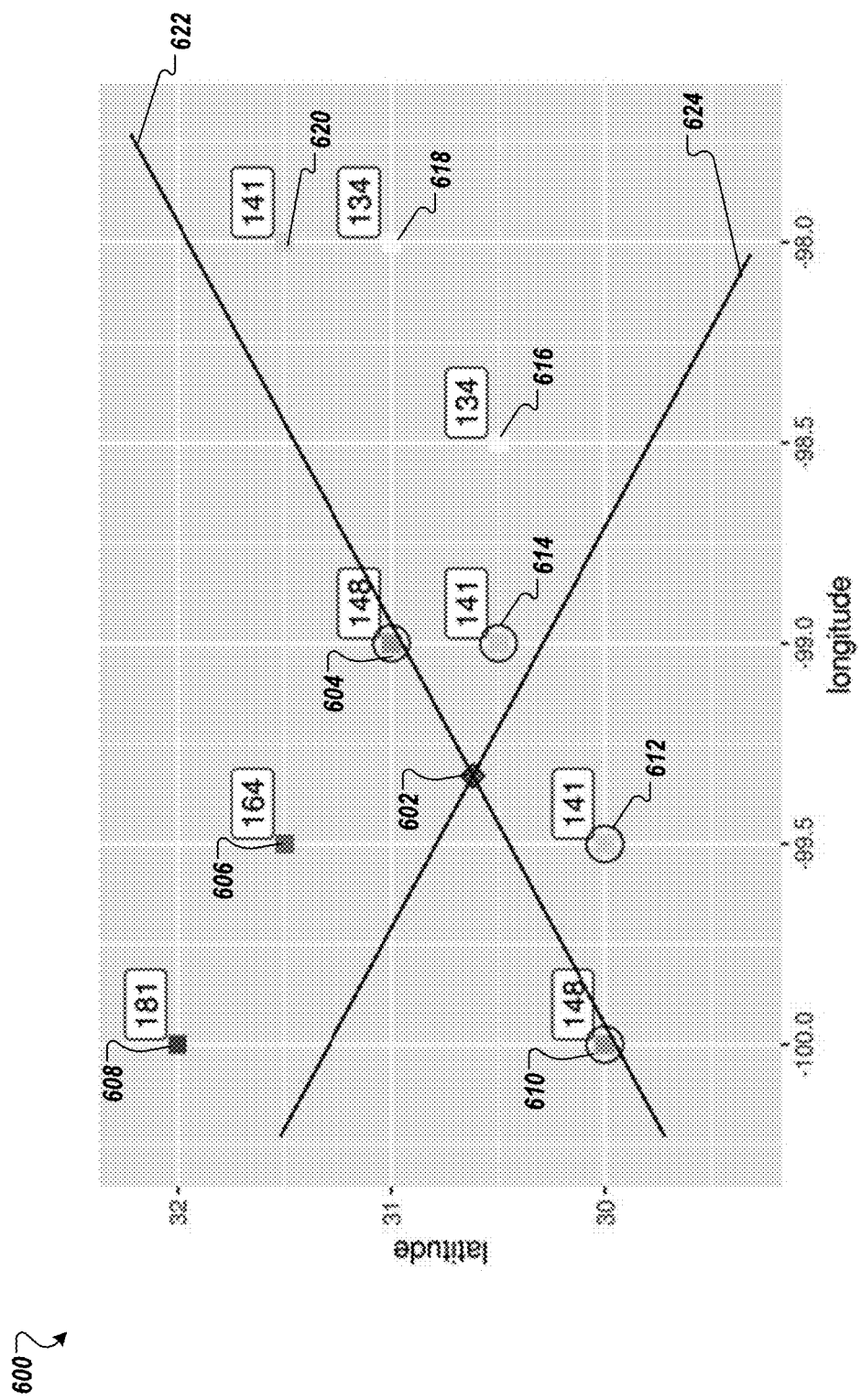
FIG. 6 is a zoomed-in grid of data points from a compressed risk model illustrating calculation of a catastrophic risk score.

For example, FIG. 6 is zoomed-in grid 600 of data points from a compressed risk model that illustrates calculation of a catastrophic risk score for a location 602 from the one or more closest data points 604-620 in the compressed risk model using a spatial interpolation or "fitting" calculation. The fitting calculation can also be used during performance of the data compression process 400 (FIG. 4) when the fitted value for a data entry is calculated in order to determine whether or not to remove that entry from the data set (408). In some embodiments, the numerical labels for the data points 604-620 shown in FIG. 6 can represent a cost of underwriting a catastrophic risk at each of the data point locations and can be a measure that is interpolated at multiple locations within the grid 600 using the fitting calculation.

In some implementations, in response to receiving location coordinates for the location 602 associated with a catastrophic risk score query, the risk score calculation engine 134 can partition an area of the compressed risk model surrounding the location 602 (for example, grid 600) with hyperplanes 622, 624 passing through the location 602. In one example, the grid 600 can be segmented into four partitions, or quadrants, with diagonal, orthogonal hyperplanes 622, 624, but it can be understood that the grid 600 can be segmented with hyperplanes at different angular orientations and can be segmented into more than four partitions using more than two hyperplanes. In some implementations, the orientation of the hyperplanes can be modified so that each of the segments divided by the hyperplanes contains approximately the same number of data points. In some examples, the number of partitions defined within the grid 600 can be based on the number of dimensions in the compressed data set such that the number of partitions is equal to $2^N$, where N is the number of dimensions. For example, in compressed data sets having two dimensions (for example, a location and a measure), the grid 600 is divided into four partitions with the hyperplanes 622, 644.

In some examples, the size of the grid 600 used for the fitting calculation may be based on the density of data points within the vicinity of the location 602. For example, for locations in the compressed risk model with a lower densities of data points, the size of the grid 600 may be larger than for locations with higher densities of data points. In one example, the size of the grid 600 may be based on capturing a predetermined number of data points within the grid 600.

In some implementations, the catastrophic risk score calculation engine 134 selects a data point in each of the partitions that is closest to the location 602, and the selected data points 604, 610, 612, 614 are used in the fitting calculation. In one example, the distances between each of the selected data points 604, 610, 612, 614 are calculated and used to determine a weighting factor for each of the data points 604, 610, 612, 614. For example, the weighting factor for a data point can be calculated using the following equation, where ballast is the ballast parameter (in this example, 0.1) and $d_i$ is spherical distance between a given data point 604, 610, 612, or 614 and the location 602:

$$\text{Weight} = \frac{1}{(\text{Ballast} + d_i)} \quad (2)$$

Table 1, below, shows the distances, weights, and underwriting cost values for each of the selected points 604, 610, 612, or 614, which results in a weighted underwriting cost of 144 for the location 602, which corresponds to the catastrophic risk score. The fitting calculation can be performed dynamically, in real-time, in response to receiving a user query due to how the strategic positioning of the data points in the compressed risk model by the data compression processes 400 and 500 (FIGS. 4-5) as well as the methodology of how the data points of compressed risk model are used to estimate the fitted measure for a query location. In some implementations, the fitted measure calculation provides a technical solution to the technical problem of efficiently calculating accurate fitted measures from compressed data models that have just a fraction of the data points of the original catastrophic data models.

TABLE 1

| Data Point | Cost Value | Distance | Weight |
| --- | --- | --- | --- |
| 604 | 148 | 52.7 | 0.26 |
| 610 | 148 | 94.2 | 0.15 |
| 612 | 141 | 34.3 | 0.40 |
| 614 | 141 | 70.7 | 0.19 |

Turning to FIG. 7, a diagram 700 of example inputs and outputs of the catastrophic risk determination system 110 is illustrated. In some implementations, the inputs 702 to the catastrophic risk determination system 110 may include insurance policy application information, such as the application data 157 input at the application data input window 202 of the catastrophic risk score user interface screen 200 (FIG. 2). In some examples, the inputs 702 can include a policy number, address, construction class, or building value. In one example, only one input 702 may be provided, such as an address or policy number, and the system 110 determines the remaining inputs from data stored in data repository 116 or provided from one or more external entities 104.

The outputs from the catastrophic risk determination system 110, in some implementations, may include loss metrics 704 (AAL, reinsurance margin, net capital costs) that can be directly derived from the calculated catastrophic risk score based on individual client data 150. In some examples, the outputs may additionally include risk analysis parameters 706 that can be generated by the catastrophic risk determination system 110 using the calculated catastrophic risk score to assist users 102 in determining whether or not to underwrite a catastrophic risk insurance policy for a particular property. The risk analysis parameters 706 may include attributed losses, fixed expense, variable expense, total cost, premium, and cost to premium ratio or percentage. For example, an underwriter may reject insurance policy applications for properties having an excessively high cost to premium ratio. In some examples, the loss metrics 704 and risk analysis parameters 706 may be calculated by the catastrophic risk score calculation engine 134.

Figure 8A:
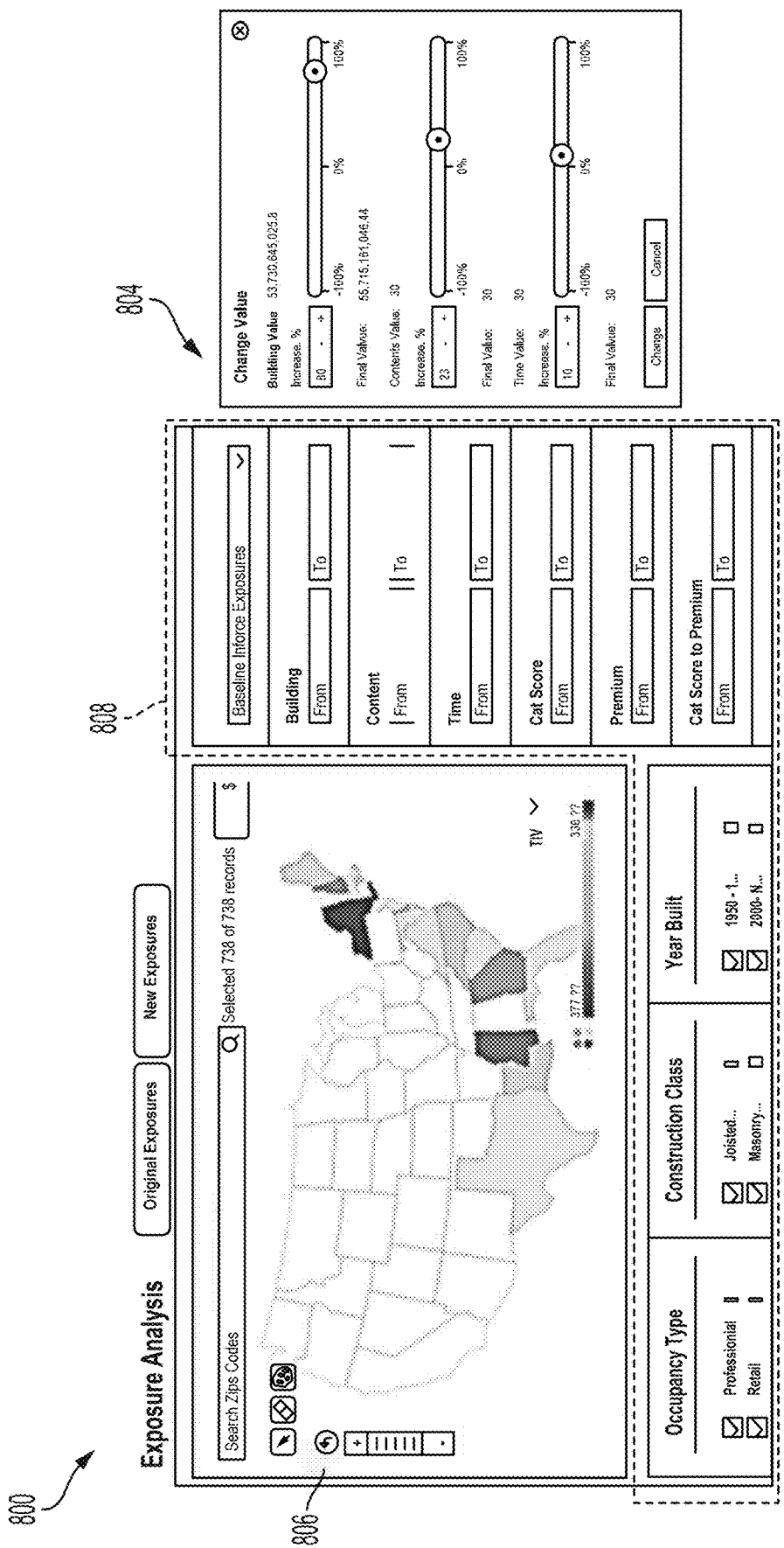

Turning to FIGS. 8A-8B, screen shots of example risk analysis user interface screens 800, 802 generated by the catastrophic risk determination system 110 are illustrated. In some implementations, the risk analysis parameters 706 generated by the catastrophic risk score calculation engine 134 based on the calculated catastrophic risk score can be configured by the front-end driver engine 140 into one or more UI screens that allow users 102 to dynamically visualize the impact of different variables on the amount of insurance risk for various locations and/or policy portfolios posed by different types of natural and manmade catastrophes.

In some implementations, the user interface screens 800, 802 may allow users 102 to evaluate the impact of changes in exposure to a given policy portfolio. For example, FIG. 8A is a screen shot of a risk analysis input user interface screen 800 that provides users 102 with a visualization of a geographic area 806 with a color-coded representation of total insurable value (TIV) for one or more regions (for example, states within the United States). In some implementations, the UI screen 800 includes filter inputs 808 that allows users 102 that allow users to filter the results shown in impact analysis UI screen 802 (FIG. 8B) based on TIV, occupancy, year built, catastrophic risk score or premium amount. Additionally, the UI screen 800 may include an additional window 804 that allows users 102 to select multiple exposure combinations and/or adjust exposure for various regions (e.g., state, county, or postal code) by percentage in order to evaluate the impact of the results. For example, the additional window 804 may allow users to select percentage amounts for an increase or decrease of building value, content value, and/or time value.

FIG. 8B is a screen shot of impact analysis UI screen 802 that is generated by the front-end driver engine 140 of the catastrophic risk determination system 110 in response to receiving input filter selections at the UI screen 800 and including the additional input window 804. In some implementations, the impact analysis UI screen 802 generates a comparison of a base portfolio 810 (e.g., a current portfolio maintained by an insurance carrier) and a target portfolio 812 (e.g., a portfolio having properties based on the filter inputs provided at the UI screen 800). In some embodiments, the UI screen 802 may also generate results based on catastrophic risk scores calculated using one or more compressed risk models for a particular type of casualty 814 (e.g., AIR VT53 INT, RMS v15 NT), which may include a blend of two or more risk models. In one example, the UI screen 802 can present a side-by-side comparison of loss metrics (e.g., AAL, reinsurance margin, capital costs) and accumulation metrics (e.g., probable maximum loss (PML), Tail Value at Risk (TVaR)) for the base portfolio 810 and the target portfolio 812. In some implementations, the UI screens 800, 802 shown in FIGS. 8A-8B can also be used to perform additional types of portfolio analyses. In one example, an impact of deductible change can be evaluated for various regions in a particular insurance policy portfolio. In another example, the UI screens 800, 802 can be used to provide analysis results detailing the impact to an existing portfolio of acquiring one or more book opportunities.

Figure 9:
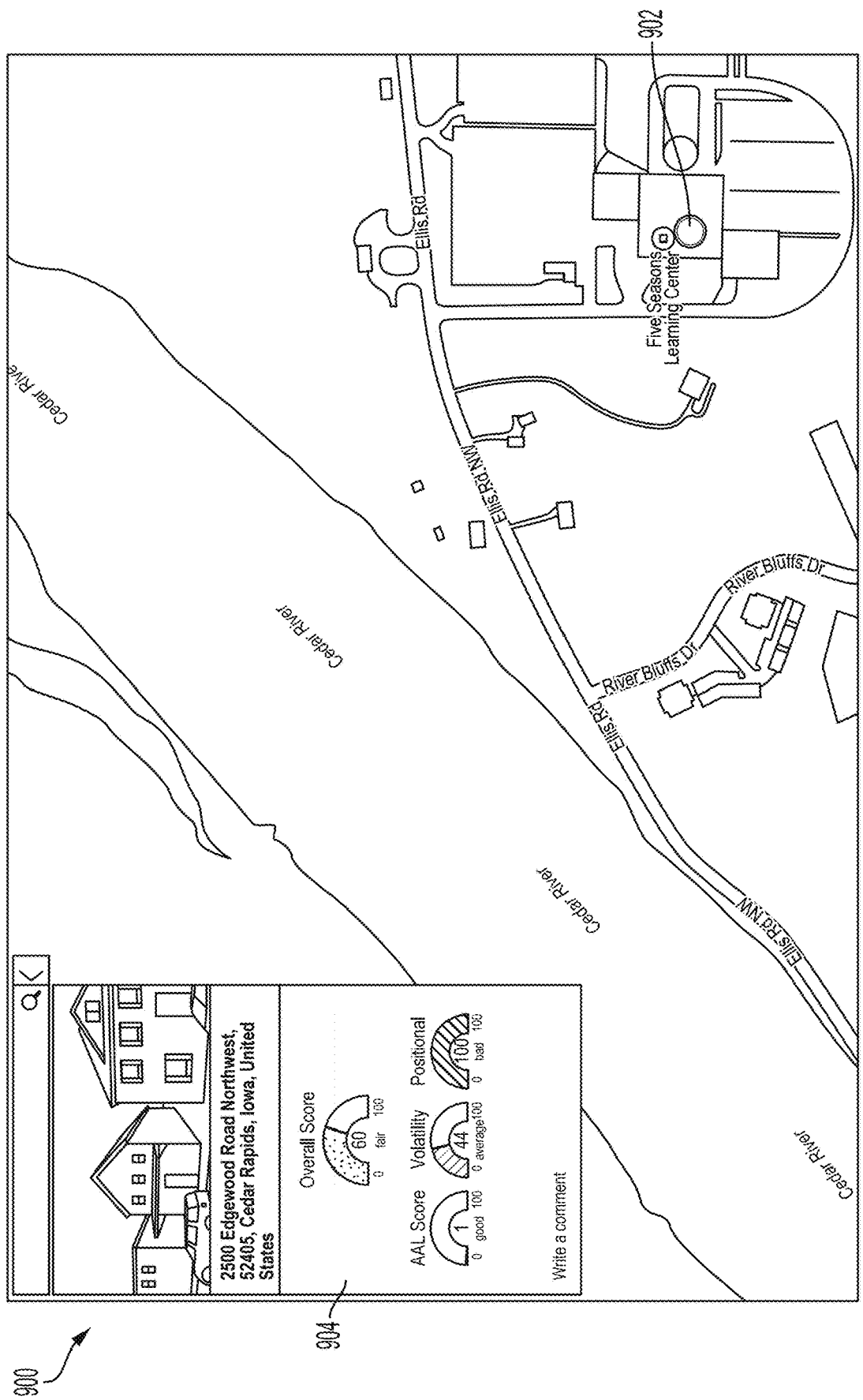
FIG. 9 is a screen shot of an example risk analysis user interface screen for a flood.

Turning to FIG. 9, a screen shot of an example risk analysis user interface screen 900 for a flood is illustrated. In some implementations, certain types of catastrophic events, such as flooding events, may have an amount of volatility associated with the calculated catastrophic risk score based on size of the property, distance to a flood source (e.g., a body of water), and change in elevation within the property (for example, one building on a property may be positioned on top of a hill and may not be as vulnerable to a flood as a building on the property that sits at a lower elevation). For flooding casualties, the front-end driver engine 140, for a location 902, may output the UI screen 900 to the external devices 170 of the users 102 that includes a scoring window 904 with a volatility score along with an overall catastrophic risk score, AAL score, and positional score. In some implementations, the scoring window 904 may be presented with a visual depiction a surrounding area of the location 902 associated with the request, which is generated from the geocoded data 164 for the requested location 902. In some examples, volatility score represents a measure of uncertainty associated with severity of the catastrophic event. In one example, the AAL score can represent an absolute AAL scaled to a range of 1 to 100. Additionally, the positional score can be a measurement of variability of the AAL surrounding the location 902.

Figure 10:
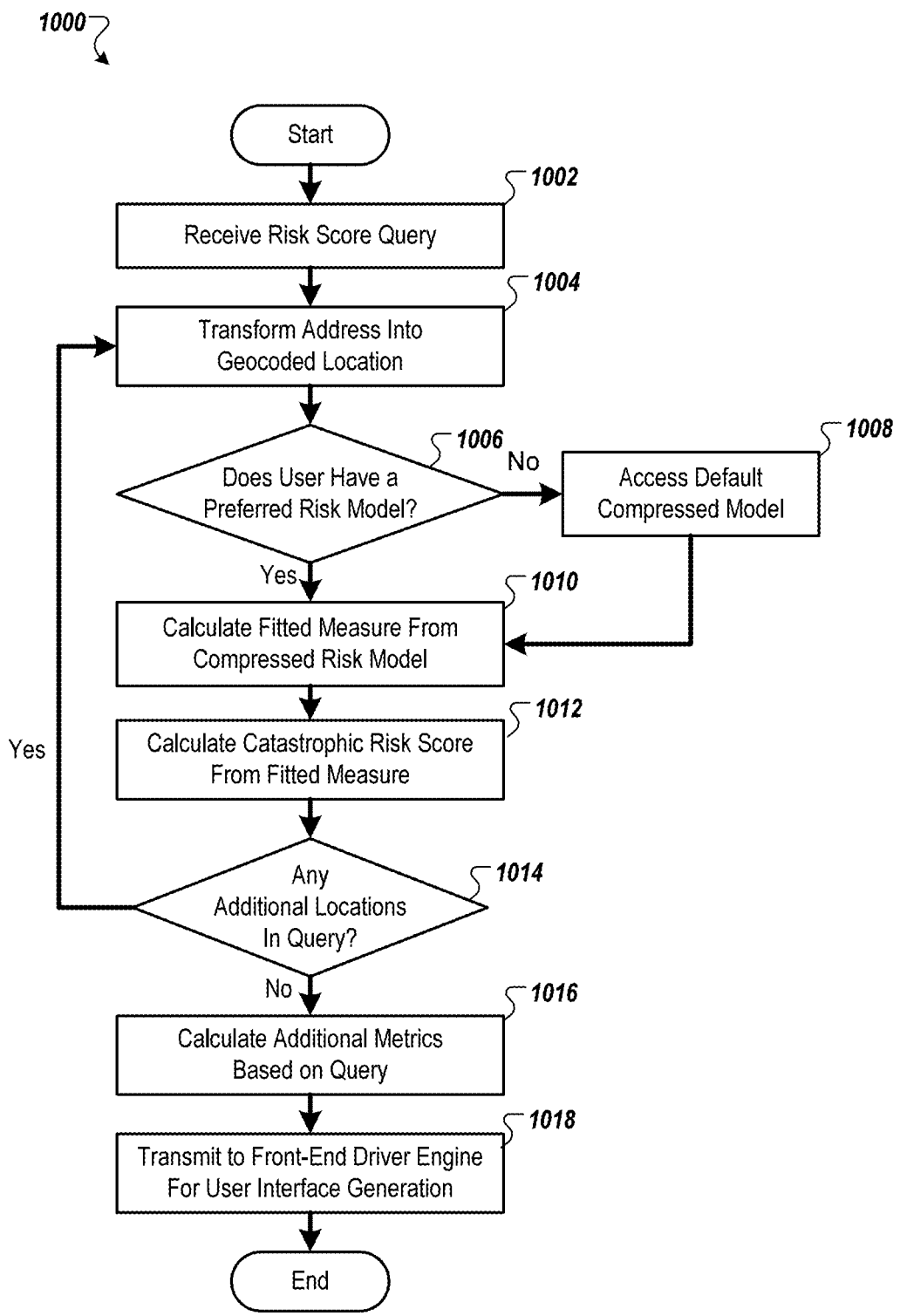
FIG. 10 illustrates a flow chart of an example method for generating a response to a catastrophic risk score query.

FIG. 10 illustrates a flow chart of an example method 1000 for generating a response to a catastrophic risk score query from a user 102. In some examples, the method 1000 is performed by one or more of the processing engines of the catastrophic risk determination system 110 such as the catastrophic risk score calculation engine 134 and the front-end driver engine 140.

In some implementations, the method 1000 commences with receiving a catastrophic risk score query from a user 102 (1002). In one example, the catastrophic risk score query corresponds to the input and submission of application data 157, which may include an address of a property, at the application data input window 202 of the catastrophic risk score UI screen 200 (FIG. 2). The address of the property included in the catastrophic risk score query may, in some examples, be transformed into a geocoded location, which may include latitude/longitude coordinates (1004). In some examples, the catastrophic risk score calculation engine 134 transforms the address into geocoded coordinates that correspond to the same type of geocoded coordinates as in geocoded data 164 and/or compressed risk models 154.

In some implementations, if the user 102 has a preferred risk model (1006), then the preferred compressed risk model, in some examples, is used to calculate a fitted measure for the location using the preferred risk model, which may include a hybrid of two or more risk models (1010). Otherwise, in some embodiments, a default compression model is used for the fitted measure calculation (1008). In some implementations, the compressed risk model is a data-compressed version of a catastrophic risk model for a particular type of casualty (e.g., tornado, flood, hurricane, wild fire, terrorist attack). In some examples, the fitted measure can be an estimated measure value for the location using spatial interpolation based on values of one or more closest data entries, which may each be weighted based on their distance from the location as described above (FIG. 6).

In some examples, a catastrophic risk score can be calculated for the location based on the fitted measure (1012). In some examples, the catastrophic risk score may correspond to exactly to the calculated fitted measure. In other examples, the catastrophic risk score may be represented by one or more loss metrics that are tailored to a particular user 102 (e.g., AAL, reinsurance margin, net capital costs). In some embodiments, if the query included more than one location and there are additional locations (1014), then, in some examples, the catastrophic risk score is calculated for the next location.

In some implementations, based on the type of information request in the query, the system 110 may compute additional risk analysis parameters that assist users 102 in determining whether or not to underwrite a catastrophic risk insurance policy for a particular property (1016). In one example, the risk analysis parameters may include attributed losses, fixed expense, variable expense, total cost, premium, and cost to premium ratio or percentage. The calculated catastrophic risk score, loss metrics, and other risk analysis parameters may, in some examples, may be transmitted to the front-end driver engine 140 for presentation to the users 102 within a user interface screen (1018). For example, the loss metrics may be presented within catastrophic risk score output window 208 of the user interface screen 200 (FIG. 2). The catastrophic risk score, loss metrics, and/or risk analysis parameters may additionally be presented within impact analysis UI screen 802 (FIG. 8B) in order to show a comparison between a current policy portfolio and a target portfolio adjusted for one or more variables.

Although illustrated in a particular series of events, in other implementations, the steps of the catastrophic risk score query response process 1000 may be performed in a different order. For example, calculation of the additional metrics (1016) may be performed before, after, or simultaneously with transmitting the catastrophic risk score, loss metrics, and/or risk analysis parameters to the front-end driver engine 140 (1018). Additionally, in other embodiments, the process may include more or fewer steps while remaining within the scope and spirit of the catastrophic risk score query response process 1000.

Figure 11:
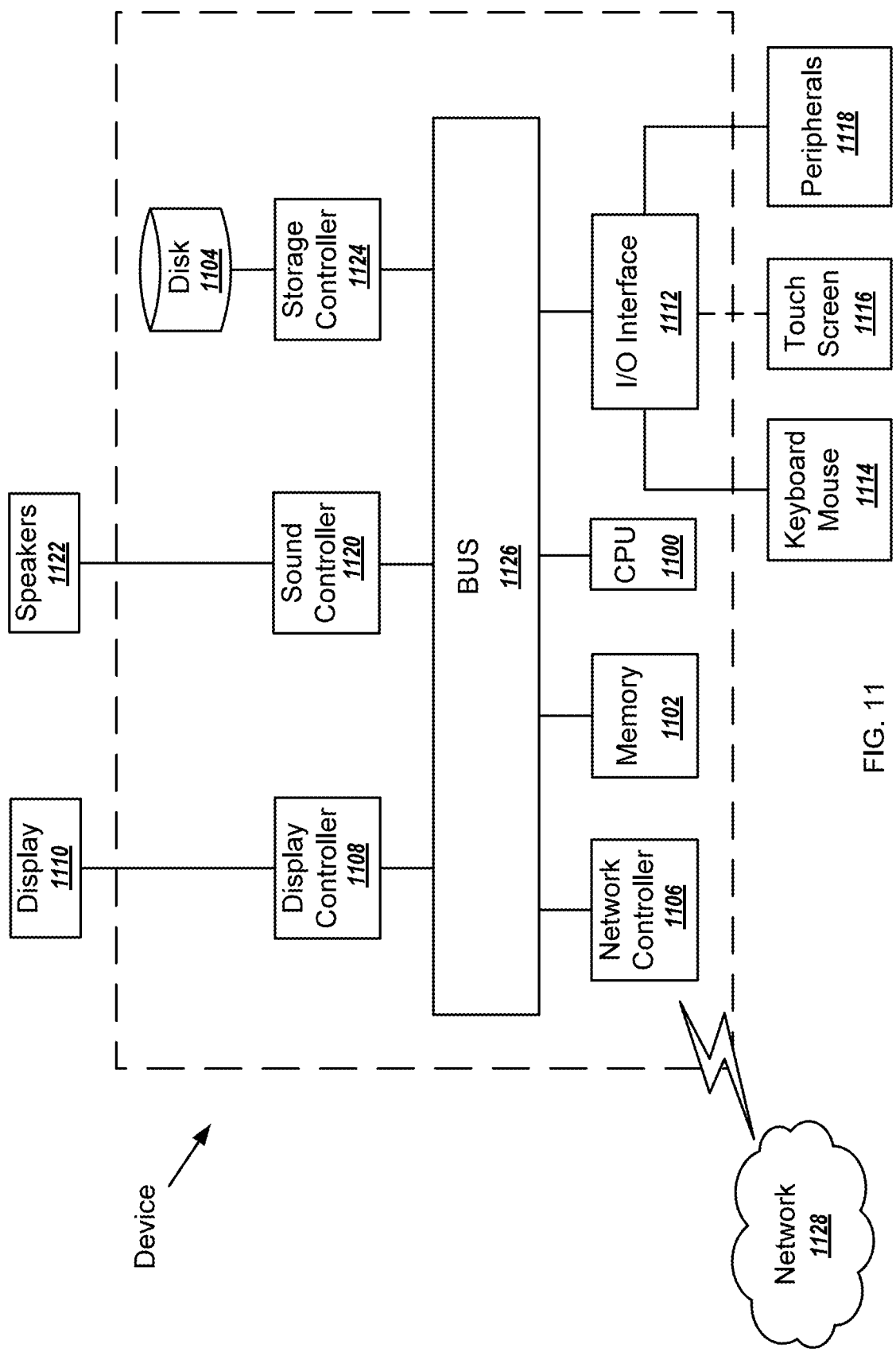
FIG. 11 is a block diagram of an example computing system.

Next, a hardware description of the computing device, mobile computing device, or server according to exemplary embodiments is described with reference to FIG. 11. The computing device, for example, may represent the external entities 104, the users 102, or one or more computing systems supporting the functionality of the catastrophic risk determination system 110, as illustrated in FIG. 1. In FIG. 11, the computing device, mobile computing device, or server includes a CPU 1100 which performs the processes described above. The process data and instructions may be stored in memory 1102. The processing circuitry and stored instructions may enable the computing device to perform, in some examples, the method 400 of FIG. 4, the method 500 of FIG. 5, or the method 1000 of FIG. 10. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 1104, in some examples, may store the contents of the data repository 116 of FIG. 1, as well as the data maintained by the external entities 104 and the users 102 prior to accessing by the catastrophic risk determination system 110 and transferring to the data repository 116.

Further, a portion of the claimed advancements may be provided as a utility application, background daemon, or component of an operating system, or combination thereof, executing in conjunction with CPU 1100 and an operating system such as Microsoft Windows 9, UNIX, Solaris, LINUX, Apple MAC-OS and other systems known to those skilled in the art.

CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computing device, mobile computing device, or server in FIG. 11 also includes a network controller 1106, such as an Intel Ethernet PRO network interface card from Intel Corporation of America, for interfacing with network 1128. As can be appreciated, the network 1128 can be a public network, such as the Internet, or a private network such as an LAN or WAN network, or any combination thereof and can also include PSTN or ISDN sub-networks. The network 1128 can also be wired, such as an Ethernet network, or can be wireless such as a cellular network including EDGE, 9G and 4G wireless cellular systems. The wireless network can also be Wi-Fi, Bluetooth, or any other wireless form of communication that is known. The network 1128, for example, may support communications between the catastrophic risk determination system 110 and any one of the external entities 104 and users 102.

The computing device, mobile computing device, or server further includes a display controller 908, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard. The display controller 1108 and display 1110 may enable presentation of the user interfaces illustrated, in some examples, in FIG. 2, FIGS. 8A-8B, and FIG. 9.

A sound controller 1120 is also provided in the computing device, mobile computing device, or server, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the computing device, mobile computing device, or server. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
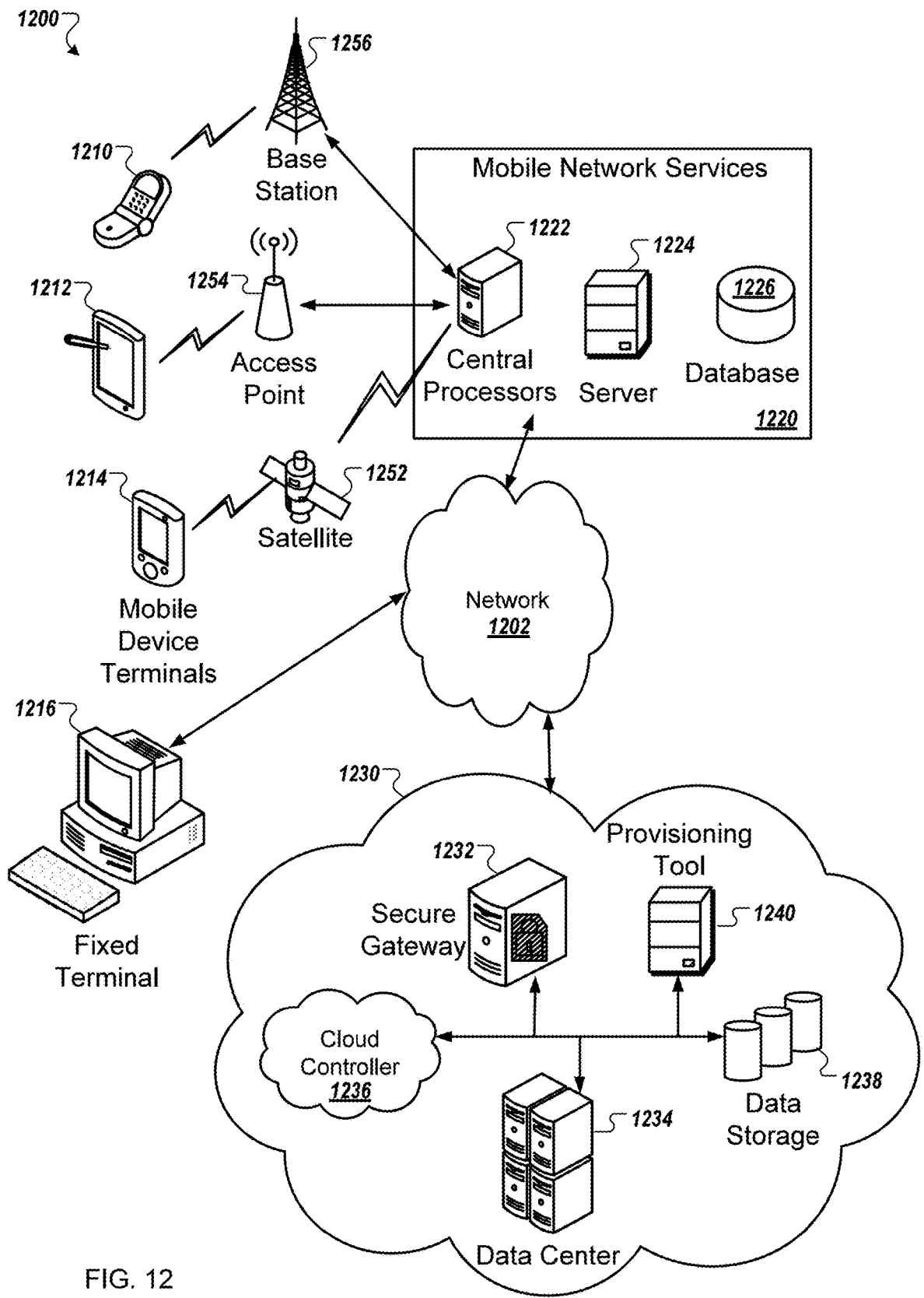
FIG. 12 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 1230, such as Google Cloud Platform™ to perform at least portions of methods or algorithms detailed above. The processes associated with the methods described herein can be executed on a computation processor, such as the Google Compute Engine by data center 1234. The data center 1234, for example, can also include an application processor, such as the Google App Engine, that can be used as the interface with the systems described herein to receive data and output corresponding information. The cloud computing environment 1230 may also include one or more databases 1238 or other data storage, such as cloud storage and a query database. In some implementations, the cloud storage database 1238, such as the Google Cloud Storage, may store processed and unprocessed data supplied by systems described herein. For example, the client data 150, catastrophic event models 152, compressed risk models 154, GUI templates 156, application data 157, property value data 158, data compression parameters 160, and/or geocoded data 164 may be maintained by the catastrophic risk determination system 110 of FIG. 1 in a database structure such as the databases 1238.

The systems described herein may communicate with the cloud computing environment 1230 through a secure gateway 1232. In some implementations, the secure gateway 1232 includes a database querying interface, such as the Google BigQuery platform. The data querying interface, for example, may support access by the catastrophic risk determination system 110 to data stored on any one of the external entities 104 and the users 102.

The cloud computing environment 1230 may include a provisioning tool 1240 for resource management. The provisioning tool 1240 may be connected to the computing devices of a data center 1234 to facilitate the provision of computing resources of the data center 1234. The provisioning tool 1240 may receive a request for a computing resource via the secure gateway 1232 or a cloud controller 1236. The provisioning tool 1240 may facilitate a connection to a particular computing device of the data center 1234.

A network 1202 represents one or more networks, such as the Internet, connecting the cloud environment 1230 to a number of client devices such as, in some examples, a cellular telephone 1210, a tablet computer 1212, a mobile computing device 1214, and a desktop computing device 1216. The network 1202 can also communicate via wireless networks using a variety of mobile network services 1220 such as Wi-Fi, Bluetooth, cellular networks including EDGE, 3G and 10G wireless cellular systems, or any other wireless form of communication that is known. In some examples, the wireless network services 1220 may include central processors 1222, servers 1224, and databases 1226. In some embodiments, the network 1202 is agnostic to local interfaces and networks associated with the client devices to allow for integration of the local interfaces and networks configured to perform the processes described herein. Additionally, external devices such as the cellular telephone 1210, tablet computer 1212, and mobile computing device 1214 may communicate with the mobile network services 1220 via a base station 1256, access point 1254, and/or satellite 1252.

Aspects of the present disclosure may be directed to providing dynamic, real-time catastrophic risk assessments to users, such as underwriters of catastrophic risk insurance policies, which can be used when determining whether or not to underwrite a particular insurance policy. In some examples, generating the catastrophic risk assessments may include calculating a catastrophic risk score and one or more loss metrics tailored to a particular user, which can provide an indication of potential risk associated with insuring a property against a type of catastrophic event. In some implementations, the catastrophic risk scores can be calculated from a compressed risk model, which is a compressed representation of a catastrophic risk model received from a risk model provider, such as a government agency (e.g., FEMA). Additionally, the compressed risk model can be generated through application of a data compression algorithm to catastrophic risk model. In some examples, the data compression algorithm can be configured to optimize or strategically position data points retained in the compressed data so that more data is lost, and hence more error introduced, in areas where large errors are of relatively low concern with respect to making insurance underwriting decisions. Generating catastrophic risk scores from compressed data sets provides a substantial technical improvement over conventional catastrophic risk assessment systems in both processing speed and overall risk score accuracy due to the strategies used in the data compression.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system comprising:
processing circuitry; and
a non-transitory computer readable memory coupled to the processing circuitry, the memory storing machine-executable instructions, wherein the machine-executable instructions, when executed on the processing circuitry, cause the processing circuitry to
receive catastrophic risk models representing risk to a plurality of locations,
wherein each of the catastrophic risk models is associated with one of a plurality of types of catastrophic events, and
wherein each of the catastrophic risk models includes a plurality of data points, each data point of the plurality of data points including at least two dimensions of data including, for each location of the plurality of locations,
a) a first dimension of the at least two dimensions corresponding to geographic coordinates of the respective location, and
b) a second dimension of the at least two dimensions corresponding to a measure associated with the respective location,
for each of the catastrophic risk models, compress the respective catastrophic risk model into a respective compressed risk model, wherein compressing the respective catastrophic risk model includes
identifying, from the plurality of data points in the respective catastrophic risk model, a first portion of data points that can be estimated from one or more surrounding data points within a predetermined error tolerance,
wherein the first portion of data points is identified based in part on a density of the geographic coordinates for the respective locations of the first portion of data points and an amount of variation in the measures for the respective locations of the first portion of data points,
removing, from the respective catastrophic risk model, the first portion of data points, and
storing, within a non-transitory database storage region, the respective compressed risk model, wherein a plurality of data points in the respective compressed risk model include a remaining second portion of data points from the respective catastrophic risk model, and
compute, in real-time responsive to receiving a risk score request for a location due to a type of catastrophic event identified in the request, a catastrophic risk score for the location,
wherein the catastrophic risk score corresponds to a weighted estimation of one or more of the respective data points in the respective stored compressed risk model for the type of catastrophic event,
wherein the geographic coordinates for the one or more of the respective data points are located within a predetermined distance of the location, and
wherein the request is received from a second remote computing device via the network.

2. The system of claim 1, wherein the machine-executable instructions, when executed on the processing circuitry, further cause the processing circuitry to:
generate, in real-time responsive to receiving the risk score request, a risk score user interface screen presenting the catastrophic risk score for the location due to a potential occurrence of the type of catastrophic event.

3. The system of claim 2, wherein generating the risk score user interface screen comprises presenting the catastrophic risk score with a visual depiction of the requested location within the risk score user interface screen.

4. The system of claim 1, wherein calculating the catastrophic risk score further comprises calculating one or more loss metrics associated with the location, wherein the one or more loss metrics comprise at least one of average annual loss, reinsurance margin, net capital costs, or total costs.

5. The system of claim 4, wherein calculating the risk score comprises calculating an amount of volatility associated with the calculated catastrophic risk score, wherein the amount of volatility represents an amount of uncertainty associated with an occurrence of the type of the catastrophic event at the location.

6. The system of claim 5, wherein, when the type of catastrophic event is a flood, the volatility associated with the calculated catastrophic risk score is based on at least one of a property size at the location, a proximity of the location to a flood source, or a change in elevation at the location.

7. The system of claim 1, wherein the measure associated with the respective type of catastrophic event is a cost of underwriting catastrophic risk due to losses from the respective type of catastrophic event.

8. The system of claim 7, wherein compressing the respective catastrophic risk model into the respective compressed risk model comprises generating a loss distribution for each of the plurality of locations represented by the compressed risk model, wherein
the loss distribution represents a distribution of the costs of underwriting for the respective location.

9. The system of claim 8, wherein computing the catastrophic risk score for the location comprises computing based in part on the loss distribution at the location.

10. The system of claim 1, wherein computing the catastrophic risk score for the location comprises:
calculating a fitted measure for the location from the respective measures of the one or more of the respective data points in the respective compressed risk model; and
determining the catastrophic risk score from the fitted measure.

11. The system of claim 10, wherein calculating the fitted measure comprises:

segmenting an area of the respective compressed data model surrounding the location into a plurality of segments;

identifying, in each of the plurality of segments, a data point of the respective data points of the compressed data model that is closest to the location; and calculating, for each of the plurality of segments, the fitted measure from the identified data point in the respective segment of the plurality of segments.

12. The system of claim 11, wherein calculating the fitted measure from the identified data point comprises determining a weighting factor for the identified data point based in part on a distance from the identified data point to the location.

13. The system of claim 11, wherein segmenting the area of the respective compressed data model surrounding the location into the plurality of segments comprises determining a number of segments for the calculating the fitted measure, wherein the number of segments is based on a number of data dimensions in each of the plurality of data points in the respective compressed data model.

14. The system of claim 1, wherein the predetermined error tolerance is based in part on at least one of a desired amount of compression for the respective compressed risk model or an amount of variation in the plurality of data points in the respective catastrophic risk model.

15. A method comprising:

receiving catastrophic risk models representing risk to a plurality of entities,
  wherein each of the catastrophic risk models is associated with one of a plurality of types of catastrophic events, and
  wherein each of the catastrophic risk models includes a plurality of data points, each data point of the plurality of data points including at least two dimensions of data including, for each entity of the plurality of entities,
    a) a first dimension of the at least two dimensions corresponding to geographic coordinates of the respective entity, and
    b) a second dimension of the at least two dimensions corresponding to a measure associated with the respective entity;

for each of the catastrophic risk models, compressing, by processing circuitry, the respective catastrophic risk model into a respective compressed risk model, wherein compressing the respective catastrophic risk model includes
  identifying, from the plurality of data points in the respective catastrophic risk model, a first portion of data points that can be estimated from one or more surrounding data points within a predetermined error tolerance,
    wherein the first portion of data points is identified based in part on a density of the geographic coordinates for the respective entities of the first portion of data points and an amount of variation in the measures for the respective entities of the first portion of data points, and removing, from the respective catastrophic risk model, the first portion of data points, computing, by the processing circuitry in real-time responsive to receiving a risk score request for an entity due to a type of catastrophic event identified in the request, a catastrophic risk score for the entity, wherein
    the catastrophic risk score corresponds to a weighted estimation of one or more of the respective data points in the respective stored compressed risk model for the type of catastrophic event,
    the geographic coordinates for the one or more of the respective data points are located within a predetermined distance of the entity, and
    the request is received from a second remote computing device via the network; and
  generating, by the processing circuitry in real-time responsive to receiving the risk score request, a risk score user interface screen presenting the catastrophic risk score for the entity due to a potential occurrence of the type of catastrophic event.

16. The method of claim 15, wherein the entity is an insured property location.

17. The method of claim 15, wherein computing the catastrophic risk score for the entity comprises:
  calculating a fitted measure for the entity from the respective measures of the one or more of the respective data points in the respective compressed risk model; and
  determining the catastrophic risk score from the fitted measure.

18. The method of claim 15, wherein calculating the fitted measure comprises:
  segmenting an area of the respective compressed data model surrounding the entity into a plurality of segments;
  identifying, in each of the plurality of segments, a data point of the respective data points of the compressed data model that is closest to the entity; and
  calculating, in each of the plurality of segments, the fitted measure from the identified data point in the respective segment.

19. The method of claim 18, wherein calculating the fitted measure from the identified data point comprises determining a weighting factor for the identified data point based in part on a distance from the identified data point to the entity.

20. The method of claim 18, wherein segmenting the area of the respective compressed data model surrounding the entity into the plurality of segments comprises determining a number of segments for the calculating the fitted measure, wherein
  the number of segments is based on a number of data dimensions in each of the plurality of data points in the respective compressed data model.

21. The method of claim 15, wherein the predetermined error tolerance is based in part on at least one of a desired amount of compression for the respective compressed risk model or an amount of variation in the plurality of data points in the respective catastrophic risk model.

* * * * *